US012655311B2

(12) United States Patent
Donaldson

(10) Patent No.: US 12,655,311 B2
(45) **Date of Patent: *Jun. 16, 2026**

(54) RECYCLING PLASTICS

(71) Applicant: Sortology Ltd, Stockton-on-Tees (GB)

(72) Inventor: James Donaldson, Stockton (GB)

(73) Assignee: Sortology Ltd, Stockton-on-Tees (GB)

( * ) Notice: Subject to any disclaimer, the term of this patent is extended or adjusted under 35 U.S.C. 154(b) by 297 days.

This patent is subject to a terminal disclaimer.

(21) Appl. No.: 18/289,840

(22) PCT Filed: May 6, 2022

(86) PCT No.: PCT/GB2022/051164
§ 371 (c)(1),
(2) Date: Nov. 7, 2023

(87) PCT Pub. No.: WO2022/234296
PCT Pub. Date: Nov. 10, 2022

(65) Prior Publication Data

US 2024/0254345 A1 Aug. 1, 2024

(30) Foreign Application Priority Data

May 7, 2021 (GB) ..................................... 2106579

(51) Int. Cl.
*C09D 9/00* (2006.01)
*B29B 17/02* (2006.01)
(Continued)

(52) U.S. Cl.
CPC ................ *C09D 9/04* (2013.01); *B29B 17/02* (2013.01); *C11D 1/62* (2013.01); *B29B 2017/0296* (2013.01); *C11D 2111/18* (2024.01)

(58) Field of Classification Search
CPC ...................... C09D 9/04; B29B 17/02; B29B 2017/0296; C11D 1/62; C11D 2111/18; B29K 2105/0032; Y02W 30/64
(Continued)

(56) References Cited

U.S. PATENT DOCUMENTS

| | | | | |
|---|---|---|---|---|
| 7,052,556 B1 * | 5/2006 | Montie | .................... | C08J 11/08 134/28 |
| 7,258,750 B1 * | 8/2007 | Montie | ..................... | B08B 3/08 134/28 |

(Continued)

FOREIGN PATENT DOCUMENTS

| | | |
|---|---|---|
| EP | 0521418 B1 | 1/1996 |
| EP | 1162518 A2 | 12/2001 |

(Continued)

OTHER PUBLICATIONS

International Search Report and Written Opinion issued in counterpart PCT Application No. PCT/GB2022/051164 dated Jul. 22, 2022 (nine (9) pages).

(Continued)

*Primary Examiner* — Eisa B Elhilo
(74) *Attorney, Agent, or Firm* — E. Eric Mills; Nicholas P. Stadnyk; Maynard Nexsen PC

(57) ABSTRACT

This invention relates to the use of a surfactant for deinking plastic substrates. The invention also relates to a process for deinking plastic substrates with a deinking solution comprising the surfactant and a base.

19 Claims, 8 Drawing Sheets

VIRGIN TEST 1 TEST 4 TEST 5 TEST 6

(51) Int. Cl.
*C09D 9/04* (2006.01)
*C11D 1/62* (2006.01)

(58) Field of Classification Search
USPC .......................................................... 510/201
See application file for complete search history.

(56) References Cited

U.S. PATENT DOCUMENTS

| | | | | |
|---|---|---|---|---|
| 7,879,155 | B1 * | 2/2011 | Montie | C08J 11/06 134/28 |
| 2004/0186033 | A1 * | 9/2004 | Waldrop | C09D 9/00 510/201 |
| 2006/0089281 | A1 * | 4/2006 | Gibson | C09D 9/04 134/38 |
| 2016/0244622 | A1 | 8/2016 | McCoppin et al. | |

FOREIGN PATENT DOCUMENTS

| | | | | | |
|---|---|---|---|---|---|
| EP | 1419829 | A1 | | 5/2004 | |
| EP | 0924678 | B1 | | 9/2004 | |
| EP | 2832459 | B1 | | 4/2017 | |
| JP | H05-263382 | A | | 10/1993 | |
| JP | H09-324382 | A | | 12/1997 | |
| JP | 2001350411 | A | * | 12/2001 | G09F 3/04 |
| JP | 2005-46770 | A | | 2/2005 | |
| JP | 2015-520684 | A | | 7/2015 | |
| JP | 2018-508629 | A | | 3/2018 | |
| JP | 2018039907 | A | | 3/2018 | |
| JP | 2020094324 | A | * | 6/2020 | D21C 5/02 |
| KR | 20120065073 | A | | 6/2012 | |
| WO | 9707952 | | | 3/1997 | |
| WO | 9714844 | A1 | | 4/1997 | |
| WO | 9935223 | A1 | | 7/1999 | |
| WO | 2016134347 | A1 | | 8/2016 | |

OTHER PUBLICATIONS

Duangkamol Songsiri et al. 2002. "Use of cationic surfactant to remove solvent-based ink from rigid high density polyethylene surfaces". Colloids and Surfaces A: Physiochemical and Engineerings Aspects, vol. 204, No. 1-3.

Hatice Gecol et al. 2001. "Use of surfactants to remove water based inks from plastic films." Colloids and Surfaces A: Physiochemical and Engineerings Aspects, vol. 189, No. 1-3.

GB Search Report issued in counterpart GB Application No. 2106579.2 dated Oct. 25, 2021.

* cited by examiner

RECYCLING PLASTICS

CROSS REFERENCE TO RELATED APPLICATIONS

This application is a 35 U.S.C. § 371 U.S. national phase entry of International Application No. PCT/GB2022/051164 having an international filing date of May 6, 2022, which claims the benefit of Great Britain Application No. 2106579.2 filed May 7, 2021, each of which is incorporated herein by reference in its entirety.

This invention relates to the use of a surfactant for deinking plastic substrates. The invention also relates to a process for deinking plastic substrates with a deinking solution comprising the surfactant and a base.

BACKGROUND

Many plastic packaging materials are printed. This printing makes the items difficult to recycle, as the inks make the recycled plastic coloured and degradation products of the inks damage the quality of the resulting recycled plastic materials. These degradation products can result in visible or physical imperfections, but they can also be hazardous to health. This makes the recycling of such printed plastic packaging materials difficult.

Various methods for removing inks exist, based on combinations of surfactants, solvents and acid or caustic conditions. In most cases they are too expensive to make recycling the plastics material economically viable.

US 2016/0244622 A1 discloses a single-phase aqueous solution for removing coatings from a polymeric film, in particular a polyethylene terephthalate thermal printer film. The solution comprises, amongst others, an inorganic base composition and a surfactant composition. The surfactant composition may include one or more of: a tetraalkylammonium salt and an alkyl polyalkylene glycol ether. Specific tetraalkylammonium salts disclosed include trimethyl hexadecyl ammonium chloride. US 2016/0244622 A1 does not disclose a surfactant composition comprising a trialkyl hydroxyalkyl ammonium salt.

Hatice Gecol et al, "Use of surfactants to remove water based inks from plastic films", Colloids and Surfaces A: Physicochemical and Engineering Aspects, Volume 189, Issues 1-3, 2001, Pages 55-64, discusses that the reuse of plastic film with printing inks results in a colored polymer, which is less stiff and weaker than the original plastic upon re-extrusion. A study into the deinking of a commercial polyethylene film with water-based ink printing using different surfactants under a variety of conditions is disclosed. A range of cationic, anionic, amphoteric and nonionic surfactants are discussed, including SDS, $NP(EO)_{10}$, DDAO, CPC, and CTAB. Trialkyl hydroxyalkyl ammonium salts are not disclosed.

Duangkamol Songsiri et al, "Use of cationic surfactant to remove solvent-based ink from rigid high density polyethylene surfaces", Colloids and Surfaces A: Physicochemical and Engineering Aspects, Volume 204, Issues 1-3, 2002, Pages 261-269, discloses the effect of using cationic surfactants to deink plastic substrates. n-hexadecyl trimethyl ammonium bromide and cetyl trimethyl ammonium bromide (CTAB), are disclosed. Trialkyl hydroxyalkyl ammonium salts are not disclosed.

EP 2832459, EP 0521418 A1, EP 1419829, EP 0924678, EP 1162518, and WO 97/07952, relate to recycling of plastics, particularly to the removal of inks from plastic substrates. None of these disclose the use of trialkyl hydroxyalkyl ammonium salts for deinking plastic substrates.

BRIEF SUMMARY OF THE DISCLOSURE

In accordance with a first aspect, there is provided use of a surfactant to remove ink from plastic substrates, the surfactant being a trialkyl hydroxyalkyl ammonium salt.

The surfactant may have the structure:

(I)

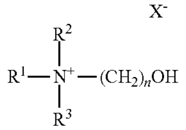

wherein $R^1$ is selected from $C_8$-$C_{20}$ alkyl, —$CH_2Ph$, and —$(CH_2)_nOH$;

$R^2$ is $C_1$-$C_6$ alkyl;

$R^3$ is $C_1$-$C_6$ alkyl;

$X^-$ is an anion; and n is selected from 2, 3, 4, 5, or 6.

In accordance with a second aspect, the present invention provides a process for removing ink from a plastic substrate, wherein the process comprises:

i) exposing the plastic substrate to an aqueous deinking solution comprising a base and a surfactant to provide a deinked plastic substrate, the surfactant the surfactant being a trialkyl hydroxyalkyl ammonium salt. The surfactant may have a structure according to formula (I):

(I)

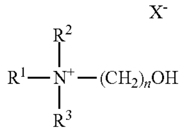

wherein $R^1$ is selected from $C_8$-$C_{20}$ alkyl, —$CH_2Ph$, and —$(CH_2)_nOH$;

$R^2$ is $C_1$-$C_6$ alkyl;

$R^3$ is $C_1$-$C_6$ alkyl;

$X^-$ is an anion; and n is selected from 2, 3, 4, 5, or 6.

The inventors have found that trialkyl hydroxyalkyl ammonium salt surfactants are capable of effectively deinking a plastic substrate. The trialkyl hydroxyalkyl ammonium salt surfactants provide a process that is considerably cheaper than processes using prior art surfactants. Because the surfactants are cheaper, it becomes economically viable to use the surfactant in a solution that also removes additional contaminants, such as food waste. In turn, this affords a simpler, more efficient and more environmentally friendly deinking and/or recycling process, as multiple cleaning, washing and deinking steps are not required.

For the avoidance of doubt, references to the surfactant, deinking solution, components of the deinking solution, plastic substrate, processing conditions (such as time, temperature, quantities of material) throughout this description may refer to use of the surfactant according to the first aspect, or the process for removing ink from a plastic substrate according to the second aspect of the invention.

Surfactant

Typically, in the use of the first aspect, the surfactant is present in a deinking solution, e.g. an aqueous deinking solution, wherein the deinking solution further comprises a base.

The deinking solution may comprise a single trialkyl hydroxyalkyl ammonium salt surfactant. Alternatively, the deinking solution may comprise a mixture of more than one trialkyl hydroxyalkyl ammonium salt surfactants. Thus, the deinking solution may comprise a surfactant of formula (I). Alternatively, the deinking solution may comprise a mixture of more than one surfactant of formula (I).

In an embodiment, $R^1$ is —$CH_2Ph$. In an embodiment $R^1$ is —$(CH_2)_nOH$.

In an embodiment, $R^1$ may be $C_8$-$C_{20}$ alkyl. In an embodiment, $R^1$ may be $C_{11}$-$C_{18}$ alkyl, preferably $R^1$ may be $C_{12}$-$C_{14}$ alkyl. In an embodiment $R^1$ is $C_{12}$ alkyl. In an embodiment, $R^1$ is $C_{14}$ alkyl.

In an embodiment, the deinking solution may comprise a mixture of surfactants having $R^1$ with a range of alkyl chain lengths selected from $C_8$ to $C_{20}$. The deinking solution may comprise a mixture of surfactants having $R^1$ with a range of alkyl chain lengths selected from $C_{11}$ to $C_{18}$. The deinking solution may comprise a mixture of surfactants having $R^1$ with a range of alkyl chain lengths selected from $C_{12}$ to $C_{14}$. For example, the deinking solution may comprise both a surfactant with $R^1$ being $C_{12}$ alkyl and a surfactant with $R^1$ being $C_{14}$ alkyl.

In an embodiment, $R^2$ may be $C_1$-$C_3$ alkyl, preferably $R^2$ may be $C_1$ alkyl. In an embodiment, $R^3$ may be $C_1$-$C_3$ alkyl, preferably $R^3$ may be $C_1$ alkyl. In an embodiment, both $R^2$ and $R^3$ are $C_1$-$C_3$ alkyl. In an embodiment, both $R^2$ and $R^3$ are $C_1$ alkyl.

In an embodiment, X is selected from halide ($F^-$, $Cl^-$, $Br^-$, $I^-$), hydroxide ($^-OH$), acetate (—OC(O)Me) and sulphate ($SO_4^-$). In an embodiment, $X^-$ is selected from chloride ($Cl^-$), bromide ($Br^-$), and iodide ($I^-$). In an embodiment, $X^-$ is chloride.

In an embodiment, n is 2, or 3. In an embodiment, n is 2.

In an embodiment, $R^2$ and $R^3$ are $C_1$-$C_3$ alkyl; $X^-$ is selected from chloride ($Cl^-$), bromide ($Br^-$), and iodide ($I^-$); and n is 2, or 3. In an embodiment, $R^2$ and $R^3$ are each $C_1$ alkyl, i.e. methyl; $X^-$ is chloride ($Cl^-$); and n is 2.

In an embodiment, the surfactant has the structure according to formula (II):

(II)

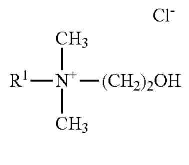

wherein $R^1$ is $C_{12}$-$C_{14}$ alkyl.

The surfactant (or mixture of surfactants) may be present in the deinking solution in an amount of from 0.025 wt % to 2 wt %. The surfactant (or mixture of surfactants) may be present in the deinking solution in an amount of from 0.05 wt % to 1.5 wt %, optionally from 0.05 wt % to 1 wt %, from 0.05 wt % to 0.6 wt %, from 0.1 wt % to 0.5 wt %, or from 0.1 wt % to 0.3 wt %. The surfactant (or mixture of surfactants) may be present in the deinking solution in an amount of 0.3 wt %.

The base may be an inorganic base. The base may comprise an alkali earth metal cation and an anion selected from hydroxide and carbonate. The base may be selected from LiOH, NaOH, KOH, $Na_2CO_3$, $NaHCO_3$, $K_2CO_3$, and $KHCO_3$. The base may be selected from LiOH, NaOH, and KOH. The base may be NaOH or KOH. The base may be both NaOH and KOH. The base may be NaOH. The base may be KOH.

The base may be present in the deinking solution in an amount of from 0.5 wt % to 10 wt %. The base may be present in the deinking solution in an amount of from 1 wt % to 10 wt %, optionally from 2 wt % to 6 wt %.

The deinking solution may contain one or more further additives. The additive may be selected from co-solvents, anionic detergent boosters, anti-foaming agents, and combinations thereof.

The anionic detergent booster may be any anionic detergent known to the skilled person. The anionic detergent booster may be any anionic detergent that is able to remove one or more non-ink substances from the plastic substrate.

The anionic detergent booster may be selected from sodium lauryl sulfate (SLS), sodium lauryl ether sulfate (SLES), ammonium lauryl sulfate (ALS), and combinations thereof. The anionic detergent booster may be sodium lauryl sulfate (SLS) or sodium lauryl ether sulfate (SLES). The presence of anionic detergent boosters may be particularly advantageous for deinking plastic substrates having a coating or lacquer. For example, where the plastic substrate has a polyvinylidene chloride (PVDC) or acrylic layer present. In addition to facilitating the improved deinking of the plastic substrate by the surfactant, the removal of coatings such as polyvinylidene chloride (PVDC) or acrylic layers results in a purer polymer product if the plastic is subsequently recycled.

The anionic detergent booster may be present in an amount of from 0.1 to 2 wt %. The anionic detergent booster may be present in an amount of from 0.25 to 1 wt %.

The anti-foaming agent may be any anti-foaming agent known to the skilled person. The anti-foaming agent may be selected from tributyl phosphate, copolymers of propylene oxide and ethylene oxide (e.g. Genapol® PF 40), alkylsisonoanamide (Prevol 3472 N), and polydimethylsilicone based anti-foaming agents. The anti-foaming agent may be present in the deinking solution in an amount sufficient to prevent foaming of the deinking solution. Thus, the anti-foaming agent may be present in an amount of from 0.01 to 1 wt %. Preferably, the anti-foaming agent is present in an amount of from 0.01 to 0.05 wt %.

Plastic Substrate

The plastic substrate may be any plastic substrate having an ink-printed surface.

The plastic substrate may be a packaging material. The plastic substrate may be a post-consumer packaging material, i.e. a packaging material that has been used and discarded by a consumer.

The pieces of plastic film may be obtained from an energy recovery facility (ERF) or material reclamation facility (MRF). The pieces of plastic film may comprise plastic film obtained from an ERF and/or MRF and/or other post-consumer film.

The plastic substrate may be a post-industrial plastic, including post-industrial film. Post-industrial plastics are those that are recovered following production of the plastic, i.e. no-consumer use (including food exposure) of the plastic substrate has taken place.

The plastic substrate may be a Biaxially Orientated PP (BOPP) material, a film, a rigid thermoformed material, or a rigid injection moulded material.

The plastic substrate may be a bottle, bottle label, bottle cap, film lid, sheath, bag (including bread bags and carrier bags), wrapper, sachet, or any other plastic food or beverage packaging item.

The plastic substrate may be contaminated with waste, such as food waste.

The plastic substrate may be a polyolefin. The polyolefin plastic substrate may be polypropylene (PP), polyethylene (PE), or low-density polyethylene (LDPE).

The plastic substrate may be a polypropylene film, polyethylene film, or low-density polyethylene film.

The plastic substrate may also be a multilayer film.

The substrate may comprise a coating or lacquer. The plastic substrate may comprise a polyvinylidene chloride (PVDC) or acrylic layer coating.

The film may have a thickness of from 20 microns to 500 microns. The film may have a thickness of from 20 microns to 150 microns.

The ink(s) present on the plastic substrate can be any type of ink used for printing on to plastic substrates. The ink(s) include flexographic inks, UV stabilised inks, and specialised printing inks such as digi-marking for food grade plastic identification. The inks may be acrylic-based inks, pentaerythritol-based inks, resin acid inks, rosin acid inks, or combinations thereof. The ink(s) may be acrylic-based inks, pentaerythritol-based inks, or combinations thereof. The ink(s) may be acrylic-based inks.

Ink Removal/Deinking

Typically, use of the surfactant according to the first aspect, or the process of removing ink from a plastic substrate according to the second aspect, will require the surfactant or deinking solution to be in contact with the plastic substrate for a period of time sufficient to maximise the removal of ink from the substrate, whilst maintaining an economical use of the surfactant.

The surfactant or deinking solution may be in contact with the plastic substrate for a period of 30 minutes or less, or 20 minutes or less. Preferably, the surfactant or deinking solution may be in contact with the plastic substrate for a period of 10 minutes or less.

Typically, use of the surfactant according to the first aspect, or the process of removing ink from a plastic substrate according to the second aspect will require the temperature of the aqueous deinking solution to be proportional to the robustness of the ink that is present on the plastic substrate. For example, a more robust ink may require a higher temperature in order to be removed from the plastic substrate.

The aqueous deinking solution may be at a temperature of from 35° C. to 90° C., optionally at a temperature of from 50° C. to 90° C., further optionally from 75° C. to 90° C.

The deinking solution may advantageously also remove food waste or other contaminants from the plastic substrate, removing the requirement for additional or separate washing of the plastic substrate.

The plastic substrate may be exposed to the deinking solution by spraying the deinking solution on to the plastic substrate. The plastic substrate may be exposed to the deinking solution by immersing the plastic substrate in a volume of the deinking solution. Exposing the plastic substrate to the deinking solution may comprise forming a mixture of deinking solution and plastic substrate.

The exposing step may further comprise mechanically agitating the mixture of deinking solution and plastic substrate.

Mechanically agitating the mixture of deinking solution and plastic substrate may increase the deinking of the plastic substrate, i.e increase the amount of ink removed from the plastic substrate. Mechanical agitation will typically occur at a rate and amount sufficient to facilitate physical contact between a plurality of plastic substrates within the mixture of deinking solution and plastic substrate or between the plastic substrate and an abrasive article that is also present in the mixture. The abrasive article may be a rubber or plastic article.

The step of exposing the plastic substrate to the deinking solution may occur for a period of 30 minutes or less, or 20 minutes or less. Preferably, the step of exposing the plastic substrate to the deinking solution occurs for a period of 10 minutes or less.

The temperature of the aqueous deinking solution is proportional to the robustness of the ink that is present on the plastic substrate. For example, a more robust ink may require a higher temperature in order to be removed from the plastic substrate.

The aqueous deinking solution may be at a temperature of from 35° C. to 90° C., optionally at a temperature of from 50° C. to 90° C., further optionally from 75° C. to 90° C.

The ratio of plastic substrate to deinking solution may be from 15 to 750 kg of plastic substrate per tonne of deinking solution. The ratio of plastic substrate to deinking solution may be from 200 to 300 kg of plastic substrate per tonne of deinking solution. A ratio of from 200 to 300 kg of plastic substrate per tonne of deinking solution may be used when the plastic substrate is a rigid thermoformed material, or a rigid injection moulded material. The ratio of plastic substrate to deinking solution may be from 30 to 60 kg of plastic substrate per tonne of deinking solution. A ratio of from 30 to 60 kg of plastic substrate per tonne of deinking solution may be used when the plastic substrate is a film or a Biaxially Orientated PP (BOPP) material.

The ratio of plastic substrate to deinking solution may be from 2:1 to 1:2 by mass.

The process may comprise an initial wash step to remove contaminants, such as food waste. For the avoidance of doubt, this initial wash step would precede the exposing step.

The deinking solution may advantageously also remove food waste or other contaminants from the plastic substrate, removing the requirement for additional or separate washing of the plastic substrate.

Post Ink Removal

The process may further comprise the step of recovering the deinked plastic substrate.

The process may further comprise the step of rinsing the recovered deinked plastic substrate to remove traces of food waste and/or deinking solution. Water and/or a co-solvent as defined herein may be used to rinse the recovered deinked plastic substrate.

The recovered deinked plastic substrate may be sorted into different product classes, according to the base material (e.g. polymer, colour) and/or level of deinking of the plastic substrate.

Ink that is removed from the plastic substrate can contaminate the deinking solution and prevent continued or further use of the surfactant/deinking solution for deinking plastic substrates. Inks may be removed from the deinking solution following the deinking step to regenerate the surfactant/deinking solution.

The process may further comprise the step of regenerating the deinking solution. The step of regenerating the deinking solution may comprise centrifugation and/or filtration of the deinking solution. The deinking solution may be filtered through candle filters, activated charcoal, diatomaceous earth, or any combination thereof.

The step of regenerating the deinking solution may occur simultaneously or sequentially to the step of exposing the plastic substrate to the deinking solution. Where the step of regenerating the deinking solution occurs simultaneously, a portion of the deinking solution may be continually or periodically removed from the volume of deinking solution and exposed to the centrifugation and/or filtration processes described herein. Regenerated deinking solution, i.e. deinking solution substantially free of ink, may be returned to the volume of deinking solution being used in the exposing step.

The deinked plastic substrate may be processed further to form a recycled plastic product. The deinked plastic substrate may be extruded to form the recycled plastic product. The recycled plastic product may be pellets of plastic. The pellets of plastic may be suitable for use in forming packaging materials for a food, beverage, or any other application requiring plastic of high purity.

The recycled plastic product may be deodorised.

BRIEF DESCRIPTION OF THE DRAWINGS

Embodiments of the invention are further described hereinafter with reference to the accompanying drawings, in which.

DETAILED DESCRIPTION

Figure 1:
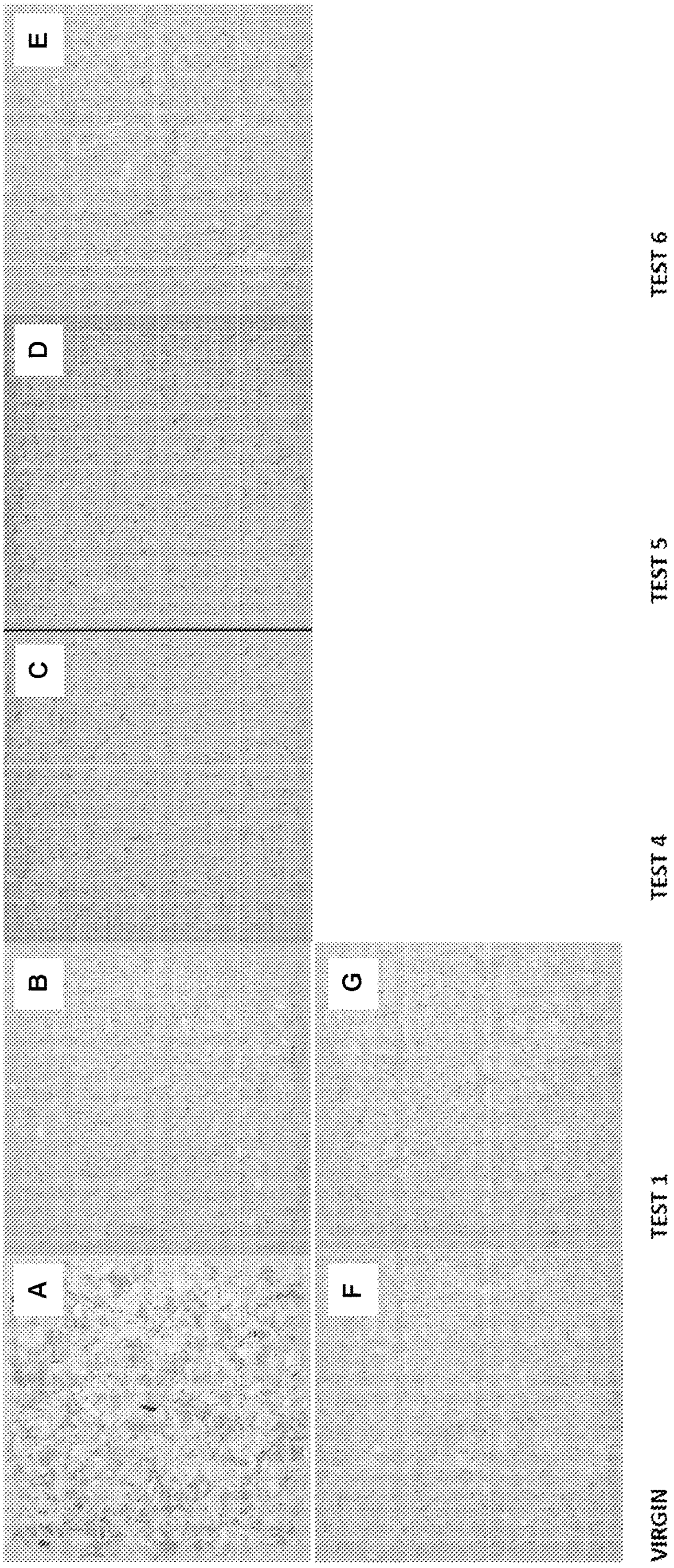
FIG. 1 shows the results of deinking plastic substrates according to the present invention. A: plastic substrate prior to deinking; B and G: deinked plastic substrate obtained as described in example 4, C: deinked plastic substrate obtained as described in example 5, D: deinked plastic substrate obtained as described in example 6, E: deinked plastic substrate obtained as described in example 7.

The terms 'deinking solution' and 'aqueous deinking solution' are used interchangeably throughout this description.

The terms 'deink', 'removal of ink', and 'ink removal' are used interchangeably throughout this description to refer to the permanent separation of ink from a plastic substrate.

A deinked plastic substrate according to the present invention is any plastic substrate defined herein, wherein the amount of ink present on the plastic substrate is less than the amount of ink on the plastic substrate prior to it being exposed to the deinking solution.

The amount of ink remaining on a deinked plastic substrate may be less than 70%, less than 60%, less than 50%, less than 40%, less than 30%, less than 20%, or less than 10% of the amount of ink present on the plastic substrate prior to being exposed to the deinking solution. The ink may be completely removed from the plastic substrate, i.e. the plastic substrate may be fully deinked.

The amount of ink remaining on the deinked plastic may be determined by comparing the dry weight of the plastic substrate before and after the deinking has occurred. The amount of ink remaining on the deinked plastic may be determined by using a volatile solvent (such as acetone or IPA) to strip the surface of the plastic substrate. After stripping, both the solvent and the cleaned substrate are dried and the weight of removed ink is determined by the average weight loss of the plastic substrate and the weight of ink recovered.

For the avoidance of doubt, and unless otherwise explicitly disclosed (such as in the case of a deinked or fully deinked plastic substrate) a plastic substrate is a substrate comprising any non-zero amount of ink on at least one of its surfaces.

The term 'exposing the plastic substrate to an aqueous deinking solution', or variants thereof, means that the deinking solution is brought into contact with the plastic substrate.

The terms 'robust ink', 'more robust ink', or 'less robust ink' refer to the relative strength of adhesion of an ink to the surface of the plastic substrate. A 'more robust ink' will have a greater adhesion to a plastic substrate than a 'less robust ink'.

The term 'alkyl', as used herein, refers to a linear or branched hydrocarbon chain. For example, the term '$C_{1-6}$ alkyl' refers to a linear or branched hydrocarbon chain containing 1, 2, 3, 4, 5 or 6 carbon atoms.

Typically, the term 'alkyl' refers to a linear hydrocarbon chain comprising from 8 to 20 carbon atoms. Typically, alkyl chains are unsubstituted, except where, in certain circumstances, an alkyl group may be substituted with a phenyl or hydroxy group.

A trialkyl hydroxyalkyl ammonium salt, as used herein, refers to a salt comprising a quaternary ammonium cation having three alkyl chains and one hydroxyalkyl chain, and an anion. A trialkyl hydroxyalkyl ammonium salt, as used herein, may also refer to a salt comprising a quaternary ammonium cation having three alkyl chains and one hydroxyalkyl chain, and an anion, wherein any one of the three alkyl chains may be substituted with a phenyl or hydroxy group.

A polyolefin, as used herein, refers to any polymer formed from alkene monomer units, i.e. any linear or cyclic hydrocarbon having one or more carbon-carbon double bonds. Typically said alkene monomers are polymerised by free radical polymerisation processes to form the polyolefin.

A multilayer film, as used herein, is a laminated structure comprising one or more layers of material, each independently selected from PE, PP, Nylon, PVDC, PET, and aluminium.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Use of a surfactant according to the present invention, and the process of deinking a plastic substrate according to the present invention, give rise to substantial benefits in the recycling of plastic substrates. For example, the present invention provides improved deinking of plastic substrates such that food grade plastics are of sufficient quality following deinking that they can be added into virgin plastics (at 35 wt %) for reuse as food-grade plastic substrates.

EXAMPLES

Example 1

Approximately 100 kg of PP scrap rigid regrind with PP 'In Mould Labels' (IML) was supplied from the manufacture of butter containers.

The PP scrap flakes were processed in a laboratory stirrer, according to the following operative conditions:

| WASHING TEST # | 16 |
|---|---|
| Washing water (l) | 3 L |
| NaOH (%) | 5% |
| Surfactant (ml) | Hydroxyethyl laurdimonium chloride (40 wt % solution) 50 ml |
| Ratio water:detergent | 60:1 |
| Temperature (° C.) | 85-90 |
| Time (min) | 10 |
| samples | PP scrap with PP labels (200 g) |

Figure 2:
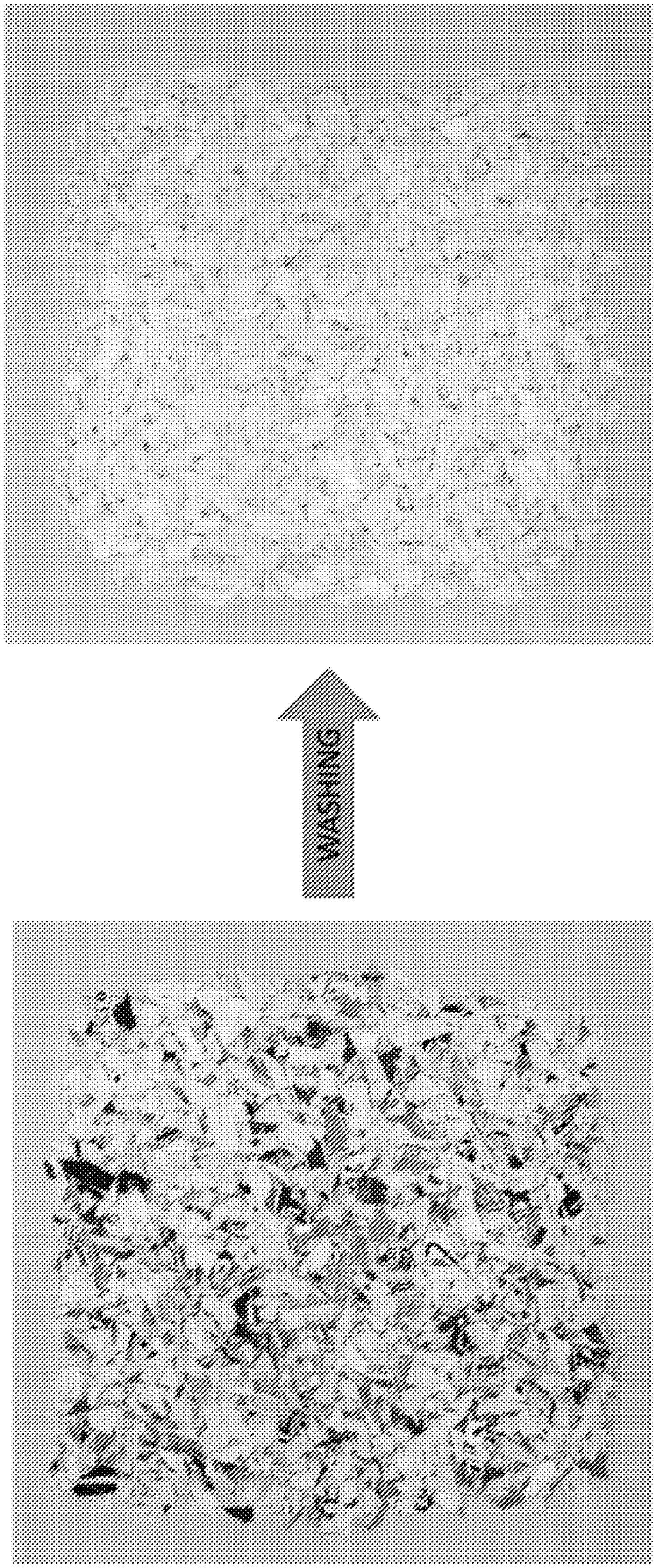
FIG. 2 shows plastic substrates supplied with In Mould Labels before and after being deinked according to the present invention and as described in example 1. The plastic substrate was deinked such that it was suitable for re-use in food-grade applications.
Figure 3:
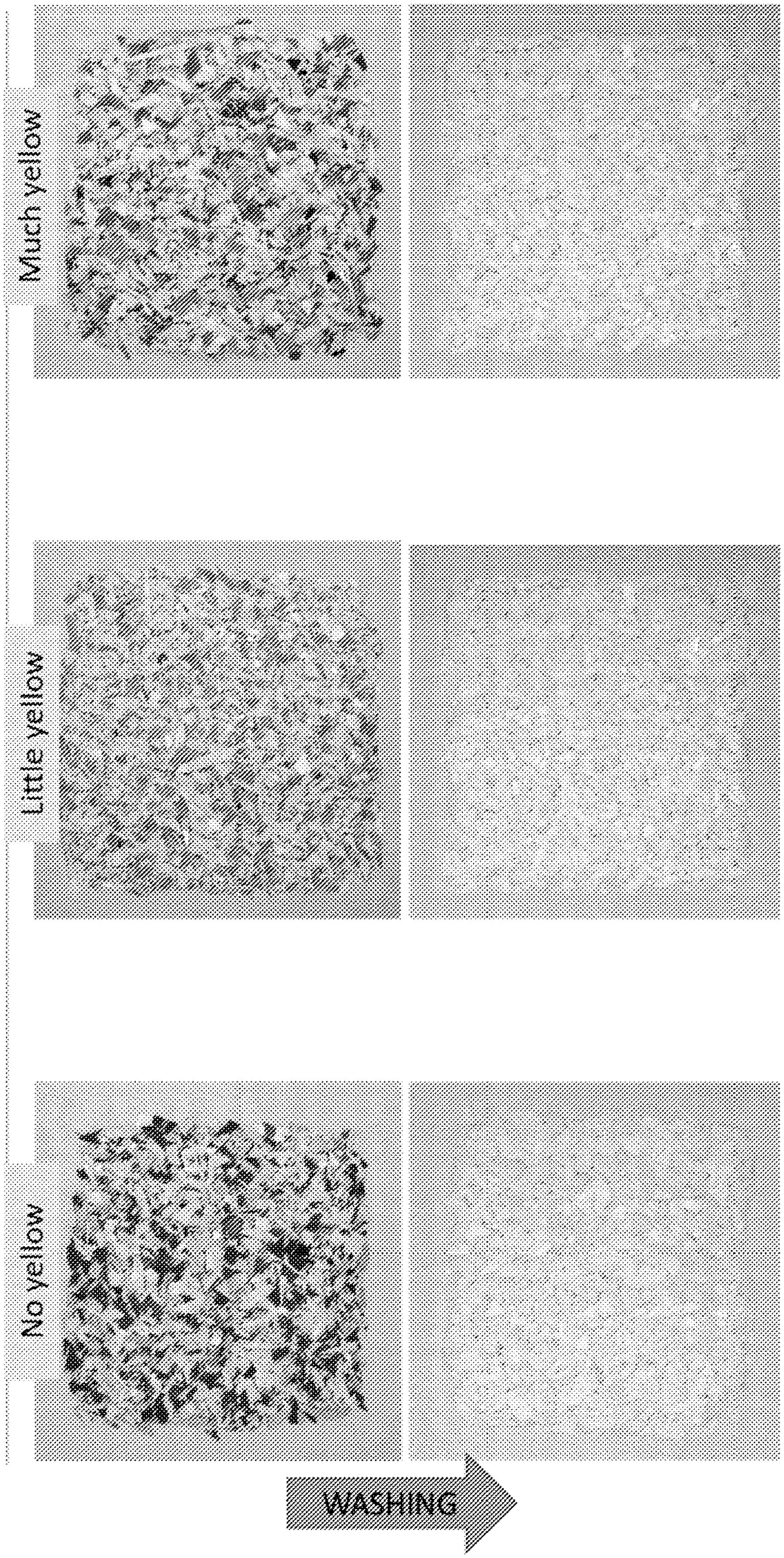
FIG. 3 shows printed thermoformed plastic substrate before and after being deinked according to the present invention. For the avoidance of doubt, 'washing' in FIG. 3 refers to deinking according to the present invention.

After washing, samples were rinsed with cold water. To facilitate the evaluation of label removal, some flakes before and after washing were selected and visually evaluated. The results of the experiment can be seen in FIG. 2.

PP IML were not removed from the surface of PP flakes. However, the writing and ink on PP IML was completely removed by the washing process.

The deinked plastic substrate was of a standard sufficient for reuse as food-grade plastic, according to German Food and Feed Code (LFGB) and European Framework Regulation (EC) No. 1935/2004.

Example 2

The process of Example 1 was repeated in a stainless steel cement mixer with 50 kg of PP scrap rigid regrind with PP IML. The mixing time remained at 10 minutes. All other conditions were scaled relative to Example 1.

As with Example 1, the process resulted in the complete removal of all print.

The deinked plastic substrate was of a standard sufficient for reuse as food-grade plastic, according to German Food and Feed Code (LFGB) and European Framework Regulation (EC) No. 1935/2004.

Example 3

LDPE films were washed to assess the removal of ink from these plastic substrates. The LDPE films were post-industrial films, i.e. plastic films received following production of the film. In other words, no-consumer use (including food exposure) of the film has occurred prior to being deinked.

The LDPE films were printed with resin acids and Rosin acids, fumarated esters with pentaerythritol. The films were printed with a loading of 0.5 $g/m^2$ line colours, 1 $g/m^2$ spot and 1.5 $g/m^2$ white inks. The LDPE films were 55 microns thick.

The printed LDPE films were washed under the following conditions:

| | |
|---|---|
| Deinking solution: | 5% NaOH<br>0.3 wt % Hydroxyethyl laurdimonium chloride<br>2 L water |
| Exposure time: | 10 minutes |
| Temperature of deinking solution: | 65° C. |
| Rinsing: | Cold water |
| Drying: | Hot air |

Figure 4:
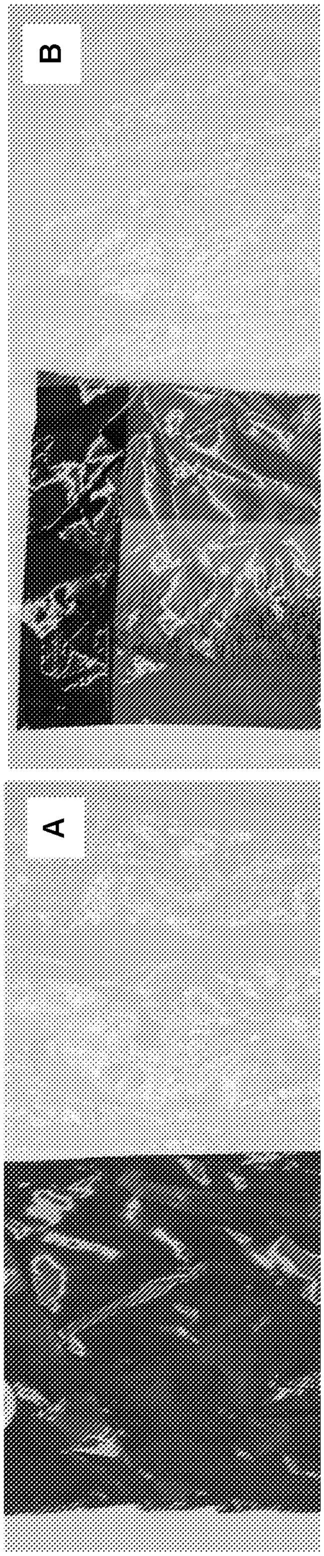
FIG. 4 shows the results of deinking LDPE plastic film according to the present invention and as described in example 3.
Figure 5:
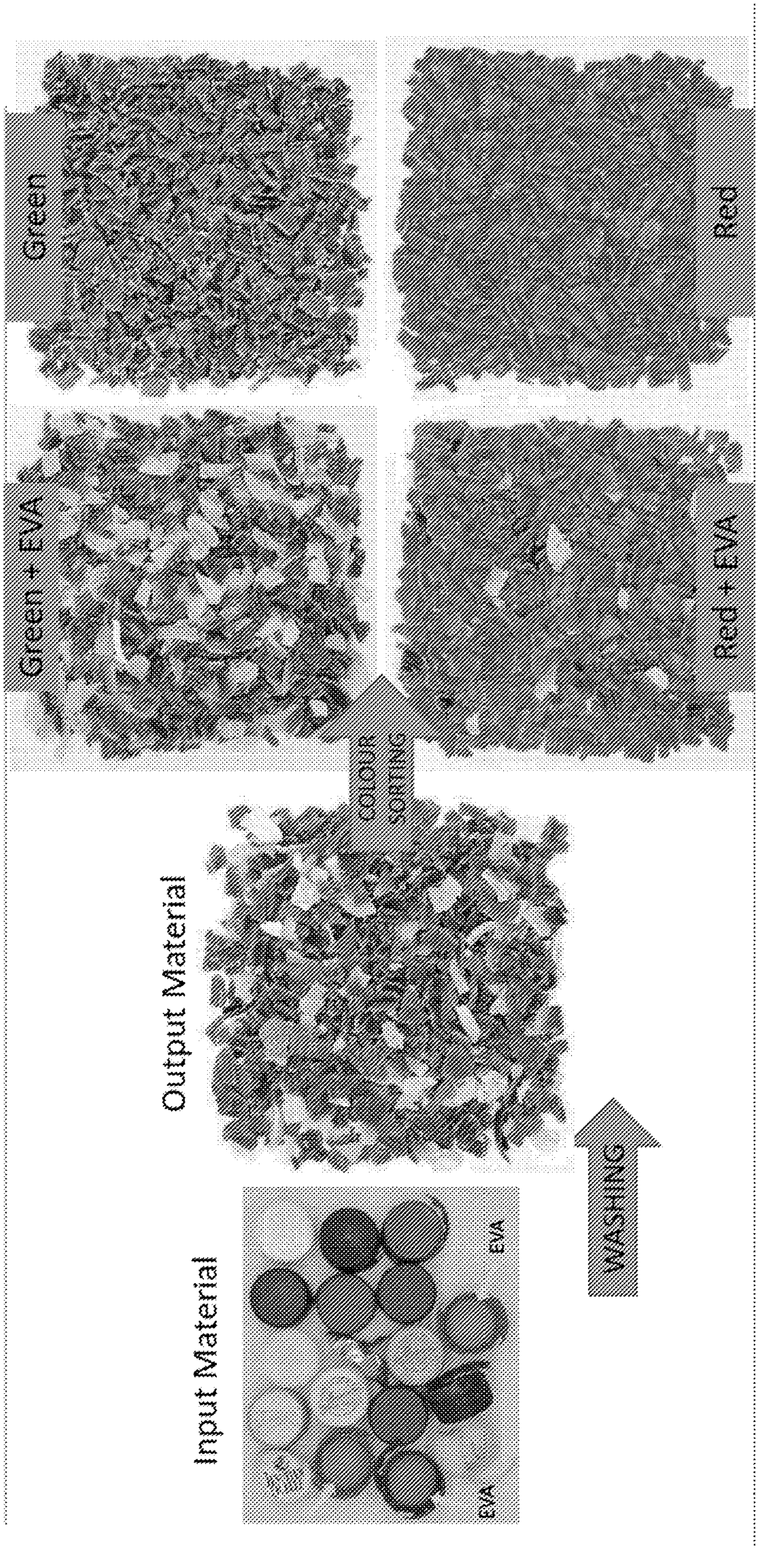
FIG. 5 shows the results of deinking post-consumer polyethylene (PE) caps. The caps were deinked according to the present invention.
Figure 6:
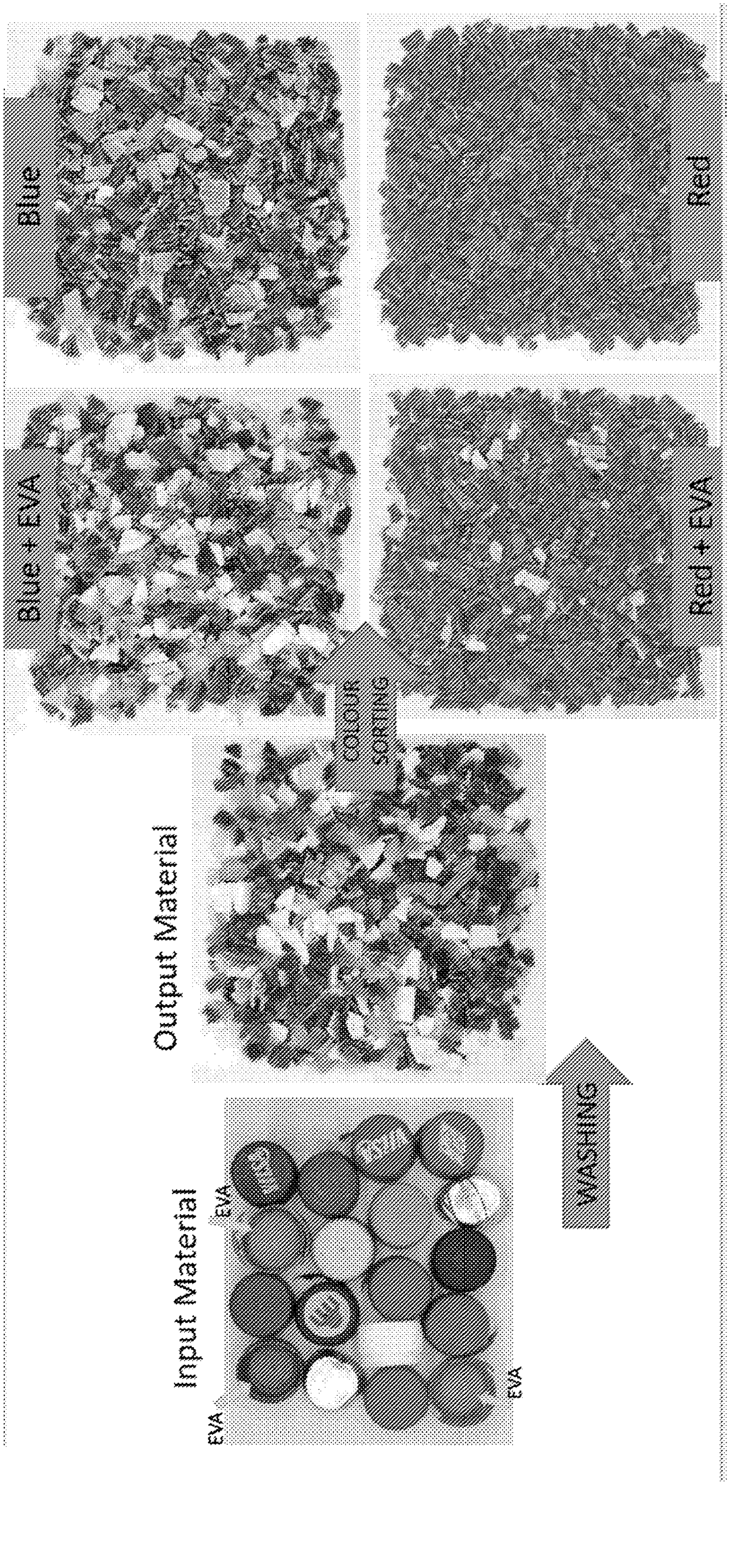
FIG. 6 shows the results of deinking post-consumer polypropylene (PP) caps. The caps were deinked according to the present invention.
Figure 7:
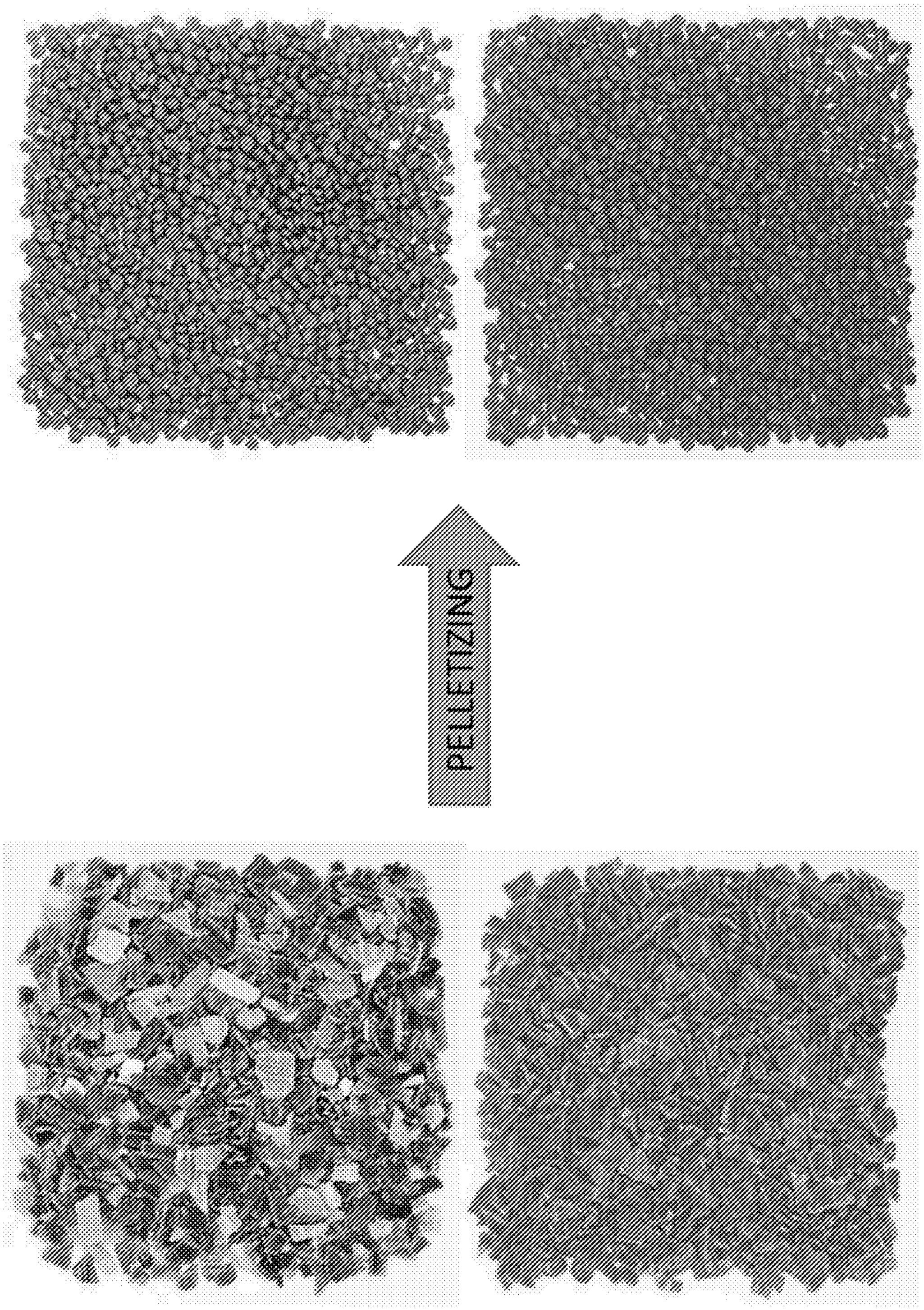
FIG. 7 shows the result of extruding the deinked and sorted plastic substrate into pellets.

Samples that were removed, rinsed, and dried were visually analysed for remaining ink. The LDPE films were found to be completely deinked, i.e. no ink remained. The results of this experiment can be seen in FIG. 4.

Example 4

200 g of plastic substrate (50 g of 20 μm thick PP film, 50 g of 50 μm thick PP film, 100 g thermoformed PP) was processed in a laboratory stirrer, according to the following operative conditions:

| WASHING TEST | TEST 1 |
|---|---|
| Washing water (l) | 3 L |
| NaOH (%) | 3% |
| Surfactant (ml) | Hydroxyethyl laurdimonium chloride (40 wt % solution) 50 ml |
| Ratio water:detergent | 60:1 |
| Temperature (° C.) | 85 |
| Time (min) | 10 |

After washing, samples were rinsed with cold water. To facilitate the evaluation of label removal, some flakes before and after washing were selected and visually evaluated. The results of the deinking process are demonstrated in FIG. 1B.

The deinked plastic substrate was of a standard sufficient for reuse as food-grade plastic, according to German Food and Feed Code (LFGB) and European Framework Regulation (EC) No. 1935/2004.

Example 5

200 g of plastic substrate (50 g of 20 μm thick PP film, 50 g of 50 μm thick PP film, 100 g thermoformed PP) was processed in a laboratory stirrer, according to the following operative conditions:

| WASHING TEST | TEST 4 |
|---|---|
| Washing water (l) | 3 L |
| NaOH (%) | 2% |
| Surfactant (ml) | Hydroxyethyl laurdimonium chloride (40 wt % solution) 150 ml |
| Ratio water:detergent | 20:1 |
| Temperature (° C.) | 60 |
| Time (min) | 10 |

After washing, samples were rinsed with cold water. To facilitate the evaluation of label removal, some flakes before and after washing were selected and visually evaluated. The results of the deinking process are demonstrated in FIG. 1.

Example 6

200 g of plastic substrate (50 g of 20 μm thick PP film, 50 g of 50 μm thick PP film, 100 g thermoformed PP) was processed in a laboratory stirrer, according to the following operative conditions:

| WASHING TEST | TEST 5 |
|---|---|
| Washing water (l) | 3 L |
| NaOH (%) | 2% |
| Surfactant (ml) | Hydroxyethyl laurdimonium chloride (40 wt % solution) 150 ml |
| Ratio water:detergent | 20:1 |
| Temperature (° C.) | 85 |
| Time (min) | 10 |

After washing, samples were rinsed with cold water. To facilitate the evaluation of label removal, some flakes before and after washing were selected and visually evaluated. The results of the deinking process are demonstrated in FIG. 1.

Example 7

200 g of plastic substrate (50 g of 20 μm thick PP film, 50 g of 50 μm thick PP film, 100 g thermoformed PP) was processed in a laboratory stirrer, according to the following operative conditions:

| WASHING TEST | TEST 6 |
|---|---|
| Washing water (l) | 3 L |
| NaOH (%) | 2% |
| Surfactant (ml) | Hydroxyethyl laurdimonium chloride (40 wt % solution) 50 ml |
| Anionic detergent booster | Sodium lauryl sulfate 25 ml |
| Ratio water:detergent | |
| Temperature (° C.) | 60 |
| Time (min) | 10 |

After washing, samples were rinsed with cold water. To facilitate the evaluation of label removal, some flakes before and after washing were selected and visually evaluated. The results of the deinking process are demonstrated in FIG. 1.

Comparative Example 8

A deinking solution comprising 3 wt % NaOH and 2 wt % of one of the surfactants listed below was used to compare the deinking capabilities of several surfactants falling outside the scope of the present invention to that of a surfactant falling within the scope of the present invention. The deinking solution was heated to 70° C. and BOPP film or PP material was exposed to the solution for 2-3 hours.

| Surfactant | Result |
|---|---|
| Benzalkonium chloride | Deinking incomplete after 1 hour |
| Alkyl dimethyl benzyl ammonium chlorides (C12-16) | |
| Alkyl dimethyl ethylbenzyl ammonium chloride (C12-14) | |
| Alkyl dimethyl ethylbenzyl ammonium chlorides (C12-18) | |
| Didecyldimethylammonium chloride | |
| Hydroxyethyl laurdimonium chloride | Deinking complete after 10 minutes |

Figure 8:
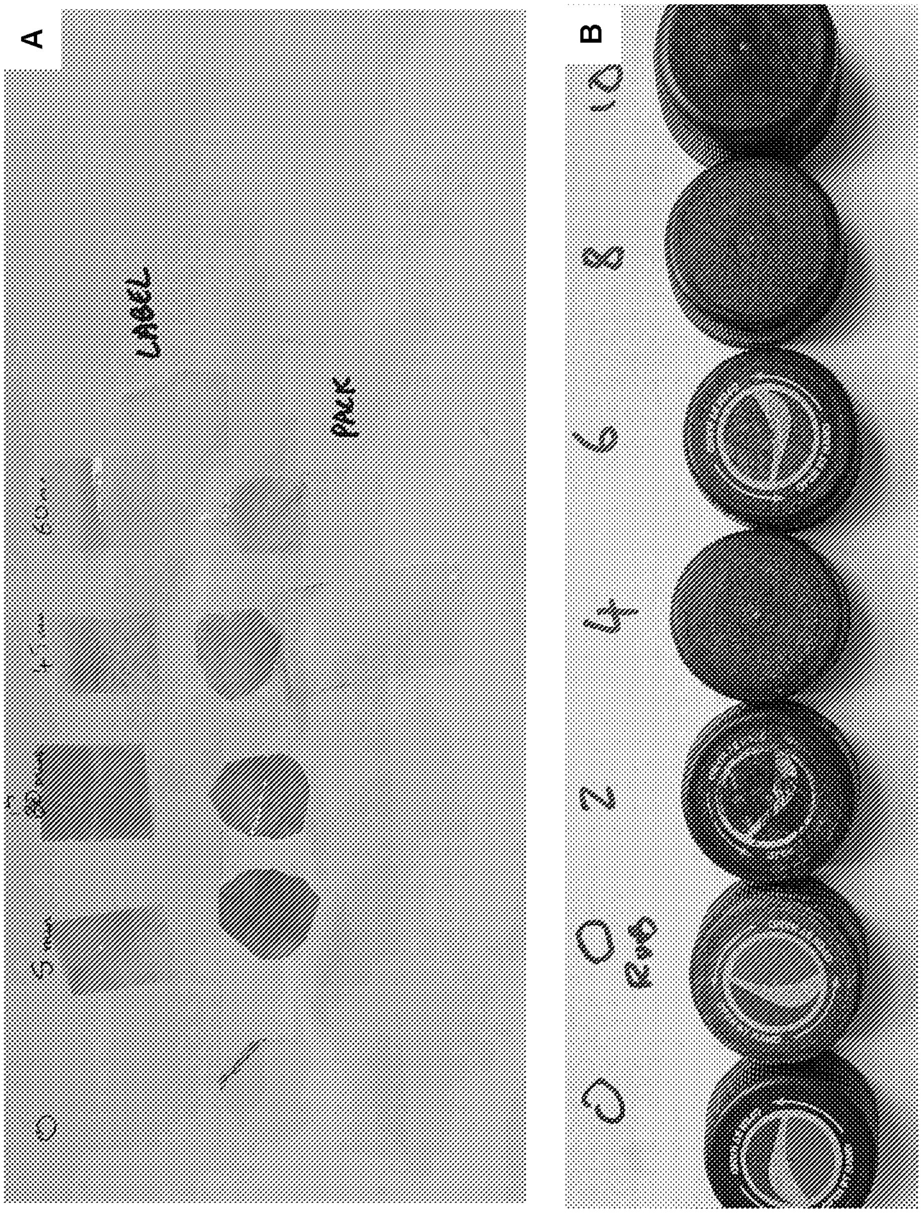
FIG. 8 shows the results of deinking experiments using surfactants falling outside the scope of the present invention (8A), and corresponding results for deinking experiments using a surfactant according to the present invention (8B). These experiments are described in Comparative Example 8.

The results of these experiments are shown in FIG. 8B, in which hydroxyethyl laurdimonium chloride, i.e. a surfactant according to the present invention, completely removes ink from printed bottle caps within 10 minutes (8B). Conversely, the film and labels shown in FIG. 8A are not fully deinked, even after 1 hour of exposure to a deinking solution comprising a benzalkonium chloride surfactant.

The invention claimed is:

1. Use of a surfactant in a process for removing ink from plastic substrates, comprising:

contacting a plastic substrate with a surfactant for a period of time; and providing a deinked plastic substrate, wherein the surfactant is a trialkyl hydroxyalkyl ammonium salt.

2. Use of a surfactant according to claim 1, wherein the surfactant is present in a deinking solution, the deinking solution comprising the surfactant and a base; optionally wherein the deinking solution is an aqueous deinking solution.

3. A process for removing ink from a plastic substrate, wherein the process comprises:

i) exposing the plastic substrate to an aqueous deinking solution comprising a base and a surfactant to provide a deinked plastic substrate, the surfactant being a trialkyl hydroxyalkyl ammonium salt.

4. The process of claim 3, wherein the surfactant has a structure according to formula (I):

(I)

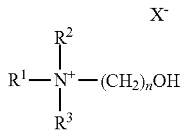

wherein $R^1$ is selected from $C_8$-$C_{20}$ alkyl, —$CH_2Ph$, and —$(CH_2)_nOH$;

$R^2$ is $C_1$-$C_6$ alkyl;

$R^3$ is $C_1$-$C_6$ alkyl;

$X^-$ is an anion; and n is selected from 2, 3, 4, 5, or 6.

5. The process of claim 4, wherein $R^1$ is $C_8$-$C_{20}$ alkyl.

6. The process of claim 4, wherein $R^2$ and $R^3$ are each $C_1$-$C_3$ alkyl.

7. The process of claim 4, wherein $X^-$ is selected from halide ($F^-$, $Cl^-$, $Br^-$, $I^-$), hydroxide ($^-OH$), acetate (—OC(O)Me) and sulphate ($SO_4^-$).

8. The process of claim 4, wherein n is 2.

9. The process of claim 4, wherein the surfactant has a structure according to formula (II):

(II)

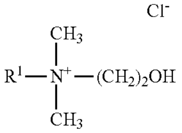

wherein $R^1$ is $C_{12}$-$C_{14}$ alkyl.

10. The process of claim 3, wherein the base is an inorganic base selected from LiOH, NaOH, KOH, $Na_2CO_3$, $NaHCO_3$, $K_2CO_3$, and $KHCO_3$.

11. The process of claim 3 wherein the base is NaOH.

12. The process of claim 3, wherein the surfactant is present in the deinking solution in an amount of from 0.025 wt % to 2 wt %.

13. The process of claim 3, wherein the base is present in the deinking solution in an amount of from 0.5 wt % to 10 wt %.

14. The process of claim 3, wherein the deinking solution further comprises an anionic detergent booster.

15. The process of claim 14, wherein the anionic detergent booster is selected from sodium lauryl sulfate (SLS), sodium lauryl ether sulfate (SLES), ammonium lauryl sulfate (ALS), and combinations thereof.

16. The process of claim 14, wherein the anionic detergent booster is present in an amount of from 0.1 to 2 wt %.

17. The process of claim 3, wherein the plastic substrate is selected from polypropylene (PP), polyethylene (PE), and low-density polyethylene (LDPE).

18. The process of claim 3, wherein the plastic substrate is a film.

19. The process of claim 3, wherein the surfactant is in contact with the plastic substrate for a period of 10 minutes or less.

* * * * *